United States Patent
Watabe

(10) Patent No.: US 6,948,989 B2
(45) Date of Patent: Sep. 27, 2005

(54) METHOD AND APPARATUS OF CONTROLLING AN ENGINE AT START-UP, AND A PERSONAL WATERCRAFT

(75) Inventor: Satoru Watabe, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/685,660

(22) Filed: Oct. 14, 2003

(65) Prior Publication Data

US 2004/0110433 A1 Jun. 10, 2004

(30) Foreign Application Priority Data

Oct. 16, 2002 (JP) ........................................ 2002-301371

(51) Int. Cl.$^7$ ............................................. B60K 41/00
(52) U.S. Cl. .............................................. 440/87; 440/1
(58) Field of Search ........................... 440/1, 2, 84–87, 440/38; 123/179.1, 179.3, 179.5, 198 F

(56) References Cited

U.S. PATENT DOCUMENTS 5,930,992 A * 8/1999 Esch et al. ..................... 60/274
6,132,268 A * 10/2000 Uchino et al. ................. 440/38

FOREIGN PATENT DOCUMENTS

JP 58-206879 12/1983

* cited by examiner

*Primary Examiner*—Ed Swinehart
(74) *Attorney, Agent, or Firm*—Alleman Hall McCoy Russell & Tuttle LLP

(57) ABSTRACT

A method and apparatus of controlling an engine at the time of first combustion during start-up in which an increase in an engine speed can be regulated, and thus noises and vibrations of the engine are reduced, and a personal watercraft which does not unintentionally start moving at start-up. The method comprising the steps of detecting the start-up of the engine; detecting a warm-up condition of the engine; and controlling the engine to inhibit combustion of at least one of the cylinders of the engine according to the warm-up condition upon the detection of the start-up.

16 Claims, 7 Drawing Sheets

METHOD AND APPARATUS OF CONTROLLING AN ENGINE AT START-UP, AND A PERSONAL WATERCRAFT

BACKGROUND OF THE INVENTION

The present invention relates to a method and apparatus for regulating an increase in an engine speed at the time of first combustion during start-up, and to a personal watercraft equipped with the apparatus.

There are various kinds of engines used as a drive source of vehicles and among those engines, there is a multi-cylinder engine which is configured to adjust an amount of intake air of the whole engine by a single throttle valve. In this multi-cylinder engine equipped with such a single throttle valve, in order to realize a stabilized operation even in a low rotational speed range without being influenced by intake-air pulsations between cylinders, compared with an engine having multi-throttle valves, it is necessary to consider a setup which opens the throttle valves more greatly. As a result, significant engine noise not only occurs, but the engine speed may increase rapidly at the time of first combustion during start-up and, thus, vibrations of the engine may increase.

In personal watercraft (PWC) which are equipped with a water jet pump, since an output shaft (i.e., a crankshaft) of the engine is directly connected with an input shaft (i.e., a pump shaft) of the water jet pump substantially without engaging a component such as a clutch, when an engine speed is increased, thrust of the watercraft is generated by the water jet pump and then the watercraft may unintentionally move at start-up.

BRIEF SUMMARY OF THE INVENTION

The present invention addresses the above conditions, and it is an object of the present invention to provide a method and apparatus of controlling an engine at the time of first combustion during start-up, in which an increase in an engine speed can be regulated, and thus noises and vibrations of the engine are reduced, and also to provide a personal watercraft which does not unintentionally start moving at the start-up.

A method of controlling the speed of a multi-cylinder engine to regulate the engine speed at the start-up of the engine, comprises the steps of detecting a start-up of the engine; detecting a warm-up condition of the engine; and controlling the engine so that it does not carry out a combustion of at least one of the cylinders of the engine according to the warm-up condition of the engine upon the detection of the start-up.

An apparatus for controlling the engine speed of a multi-cylinder engine to regulate an increase of the engine speed at the start-up of the engine, comprises a start-up detector for detecting a start-up of the engine; a warm-up condition detector for detecting a warm-up condition of the engine; and a controller for controlling the engine so that it does not carry out a combustion of at least one of the cylinders of the engine according to the warm-up condition detected by the warm-up condition detector upon the detection of the start-up by the start-up detector.

According to the present invention, an increase in the engine speed is regulated according to the warm-up condition of the engine when the engine is started. Thereby, noises and vibrations of the engine at the start-up are reduced. Although this kind of control is necessary at least at the time of first combustion during the start-up, such control may be performed continuously while the engine is in the state of start-up.

Various parameters can be adopted for the detection of the start-up of the engine, and as for the start-up detector, those associating with the adopted parameters may be used. As for these parameters, since it is necessary to detect a preparation stage of the start-up prior to the first combustion during start-up, the engine speed at the time of cranking may also be used, and it is possible to determine that it is in the state where the engine starts when the engine speed is lower than a predetermined engine speed.

Moreover, when the engine is of a liquid-cooling type, detection of a coolant pressure as a parameter may be made, and it is possible to determine that it is in the state where the engine starts when the coolant pressure is lower than a predetermined pressure. The coolant may be water or any other liquid for this cooling purpose.

It is also possible to adopt a detection of an ON operation of a starter switch of the engine as a trigger of the start-up determination process in addition to the each of the above mentioned parameter conditions. In this case, for example, when the ON operation of the starter switch is detected, it determines whether or not a detected engine speed is lower than a predetermined engine speed, and then it determines that the engine is in the state of start-up when the detected engine speed is lower than a predetermined engine speed.

Similarly to the above, various parameters can also be adopted as for the detection of the warm-up condition of the engine and, as for the warm-up condition detector, those within the adopted parameters may be used. Within these parameters, a wall temperature of the engine (preferably, an outside surface temperature of a cylinder block wall) is utilized, for example. Moreover, it is also possible to adopt a wall temperature of an exhaust passage that includes an exhaust muffler of the engine. Moreover, it is also possible to adopt a temperature of a lubricant of the engine (e.g., an engine oil), or a temperature of the coolant of the engine when the engine is of a liquid-cooled type. It will be appreciated that in addition to oil, the lubricant may be virtually any other liquid suitable for this lubrication purpose.

In this way, in order to detect the warm-up condition of the engine appropriately, the warm-up condition detector may preferably be disposed at a position in a wall surface of a cylinder block of the engine, at a position in a wall surface of the engine exhaust passage in an exhaust system as close to an exhaust port of the engine (for example, in an exhaust manifold) as possible. When the exhaust passage is of a liquid-cooling type, in turn, the warm-up condition detector may also detect a temperature of a coolant within a hollow liquid jacket (e.g., a water jacket) containing the coolant and it may be disposed at a position as close to the exhaust port of the engine as possible, or at a position as close to a coolant exit from the cylinder head, etc. as possible.

The above-mentioned controller controls the multi-cylinder engine to inhibit combustion in at least one of the cylinders of the engine, so that combustion does not occur, based on detection of one or more of the parameters mentioned above. Specifically, the controller can be configured to cause a predetermined pattern of non-combustion. The predetermined pattern of non-combustion may be (1) non-combustion at every combustion opportunity for at least one of the cylinders over a predetermined time length or, (2) non-combustion at only a predetermined subset of combustion opportunities for at least one of the cylinders, such as a periodic or non-periodic pattern of non-combustion. One example of a periodic pattern of non-combustion is non-combustion at every fourth combustion opportunity. One example of a non-periodic combustion opportunity is non-combustion at a first, third, fourth, and ninth combustion opportunity. The controller may be configured to inhibit fuel supply to a selected cylinder from a fuel supply device such as a fuel injector, at appropriate times in order to cause non-combustion according to the above described predetermined pattern of non-combustion. Alternatively, the controller may be configured inhibit spark from an igniting device such as a spark plug, at appropriate times in order to cause non-combustion according to the above described predetermined pattern of non-combustion.

It will be appreciated that the controller may be an Electronic Control Unit (ECU), such as are typically provided on vehicles such as personal watercraft, which is configured to perform the controlling described herein. Thus, certain embodiments of the present invention may be implemented by making adjustments to computer programs to residing in existing ECUs, without typically modifying in any substantial way the detection systems of those vehicles.

The method and apparatus of the present invention with the above-mentioned functions can be applied to engines of various types; for example, two-cycle engines or four-cycle engines, single-throttle-valve engines, multi-throttle-valve engines, or engines of other throttle valve types. It can also be applied to carburetor-type engines, fuel injection-type engines, engines of other fuel supply systems, gasoline engines, ethanol engines, or engines of other fuel types.

Generally, four-cycle engines have a large compression ratio compared with two-cycle engines, generating a comparatively large amount of energy in each combustion stroke. Therefore, the four-cycle engine is more advantageous for application of the present invention in that it tends to have its engine speed increased at the start-up.

Moreover, many two-cycle engines adopt a throttle valve to each cylinder; that is, a multi-throttle valve, because of the configuration which compresses air in a crankcase and then is introduced into cylinders. On the other hand, since the four-cycle engine does not utilize such configuration of the crank compression, there are many of four cycles engines that adopt a single-throttle valve. Therefore, it is still more advantageous to apply the present invention to the single-throttle-valve-type four-cycle engines in which it is easier to receive interference of intake air pulsations from other cylinders.

Moreover, the controlling apparatus of the present invention can be applied to personal watercraft by which an input shaft (i.e., a pump shaft) of a water jet pump is directly connected substantially to an output shaft (i.e., a crankshaft) of an engine and, in this case, the controlling apparatus has not only an effect of reducing the noises and vibrations of the engine at the start-up, but also an effect of reducing unintentional movement of the watercraft at the start-up.

In this way, when applied to the personal watercraft, the start-up detector of the controlling apparatus may include a pressure detection mechanism configured to detect a pressure inside the water jet pump. According to this embodiment, the start up detector is configured to detect that the pressure inside the water jet pump is below a predetermined pressure, and in response, the controller is configured to perform the above-described control functions when the detected pressure is lower than the predetermined pressure.

In addition, the controlling apparatus of the present invention can be applied to all kinds of vehicles equipped with multi-cylinder engines other than the personal watercraft illustrated here, such as automobiles, motorcycles, all-terrain vehicles (ATVs), boats, ships, and airplanes. Further, the engine should be understood not to be limited only to, for example, engines for driving such vehicles, but also may be an engine such as for a power generator.

The above and further objects and features of the present invention will more fully be apparent from the following detailed description with accompanying drawings.

DETAILED DESCRIPTION OF THE INVENTION

The present invention will now be described in detail referring to the accompanying drawings illustrating the embodiment thereof.

Figure 1:
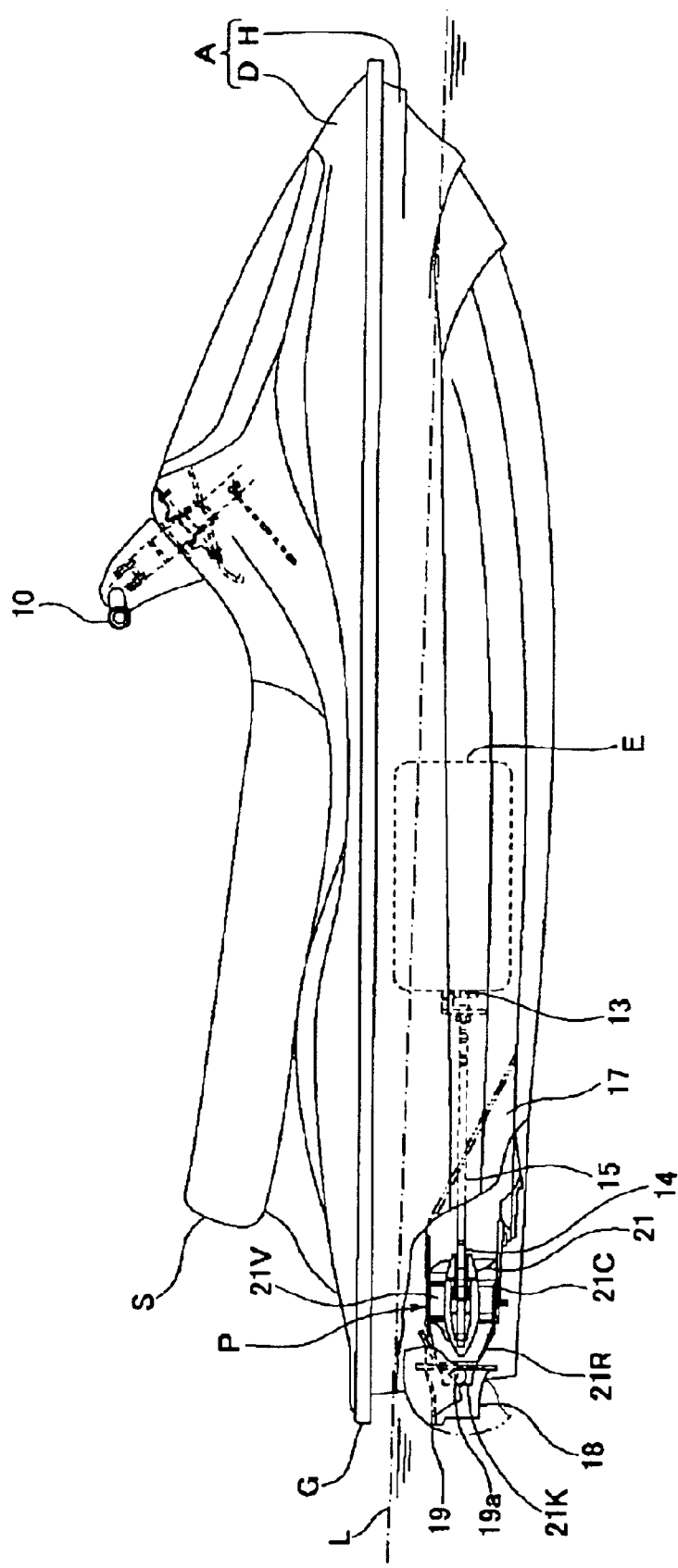
FIG. 1 is a side view of a whole personal watercraft according to an embodiment of the present invention.
Figure 2:
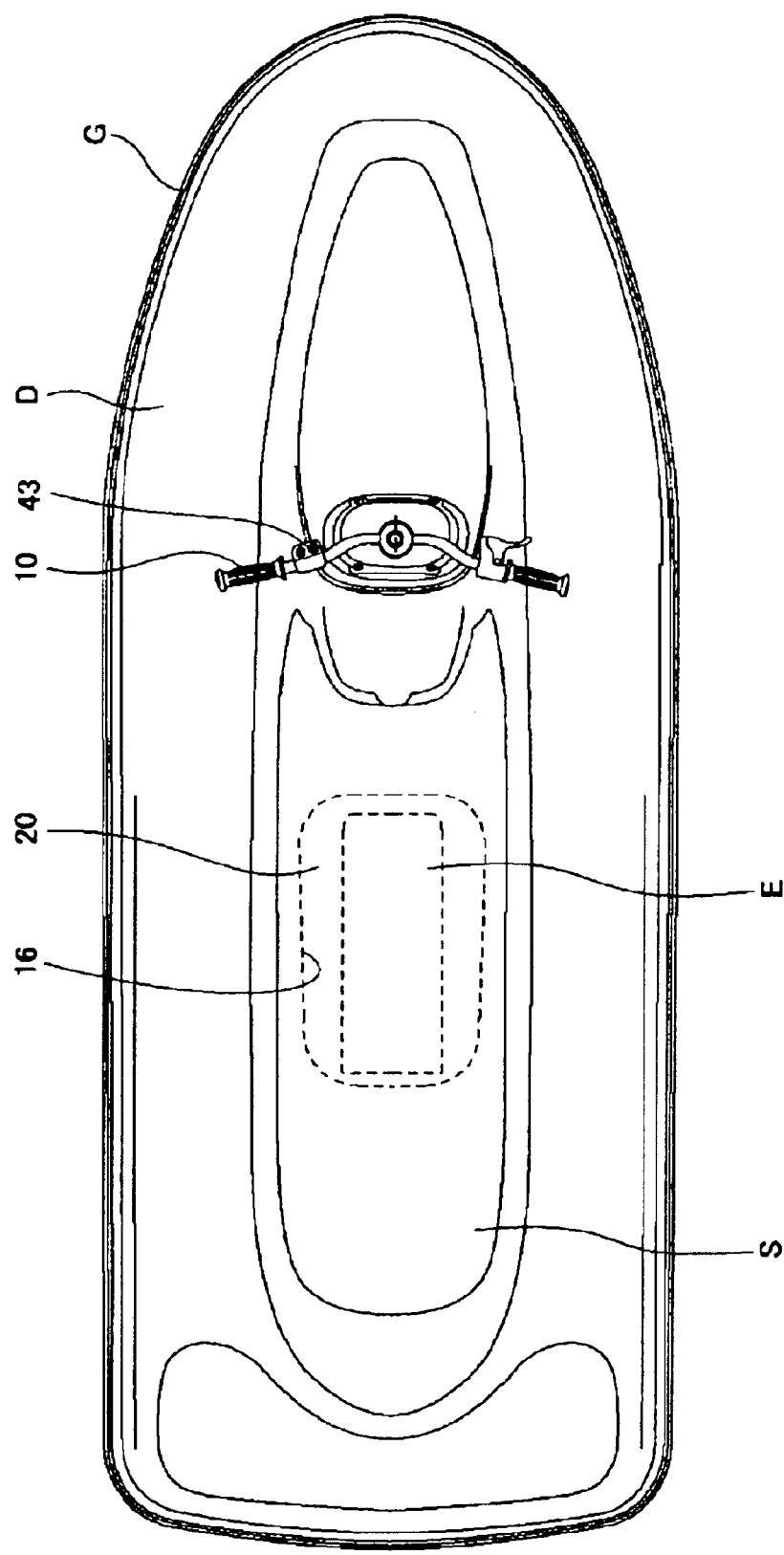
FIG. 2 is a whole plan view of FIG. 1.

FIG. 1 is a side view showing an entire personal watercraft according to an embodiment of the present invention, and FIG. 2 is a plan view of the personal watercraft in FIG. 1. In FIGS. 1, 2, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 2, an opening 16, which has a substantially rectangular shape as seen from above, is formed at a relatively rear section of the deck D such that it extends in the longitudinal direction of the body A, and a riding seat S is provided over the opening 16. An engine E is provided in a chamber (an engine room) 20 surrounded by the hull H and the deck D below the seat S. The engine E is a four-cycle, four-cylinder engine with a single throttle body 62. The throttle body 62 is disposed in an air-intake passage, especially in this embodiment, is positioned in an inlet of an air-intake manifold 61 which communicates with each of the cylinders, in order to adjust an entire amount of intake air for the engine E with a single throttle valve.

As shown in FIG. 1, a crankshaft of the engine E is mounted along the longitudinal direction of the body A. An output end 10b of the crankshaft is rotatably coupled integrally with a pump shaft of a water jet pump P through a propeller shaft 15. An impeller 21 is attached on the pump shaft of the water jet pump P. The impeller 21 is covered with a pump casing 21C on the outer periphery thereof.

A water intake 17 is provided on the bottom of the hull H. The water is sucked from the water intake 17 and fed to the water jet pump P through a water intake passage. The water jet pump P pressurizes and accelerates the water by rotation of the impeller 21. The pressurized and accelerated water is discharged through a pump nozzle 21R having a cross-sectional area of flow gradually reduced rearward, and from an outlet port 21K provided on the rear end of the pump nozzle 21R, thereby obtaining a thrust. In FIG. 1, reference numeral 21V denotes fairing vanes for fairing water flow behind the impeller 21.

As shown in FIGS. 1, 2, reference numeral 10 denotes a bar-type steering handle. The handle 10 operates in association with a steering nozzle 18 swingable around a swing shaft (not shown) to the right or to the left behind the pump nozzle 21R. When the operator rotates the handle 10 clockwise or counterclockwise, the steering nozzle 18 is swung toward the opposite direction so that the watercraft can be correspondingly turned to any desired direction.

As shown in FIG. 2, a starter switch 43 is attached on one side of the handle 10 (on the left-hand side in this embodiment) with a kill switch. The starter switch 43 is connected to an ECU (Electronic Control Unit) 3 (see FIG. 3) with which the personal watercraft of this embodiment equips.

As shown in FIG. 1, a bowl-shaped reverse deflector 19 is provided above the rear section of the steering nozzle 18 such that it can swing downward around a horizontally mounted swinging shaft 19a. The deflector 19 is swung downward to a lower position behind the steering nozzle 18 to deflect the ejected water from the steering nozzle 18 forward, and as the resulting reaction, the personal watercraft moves rearward.

Figure 3:
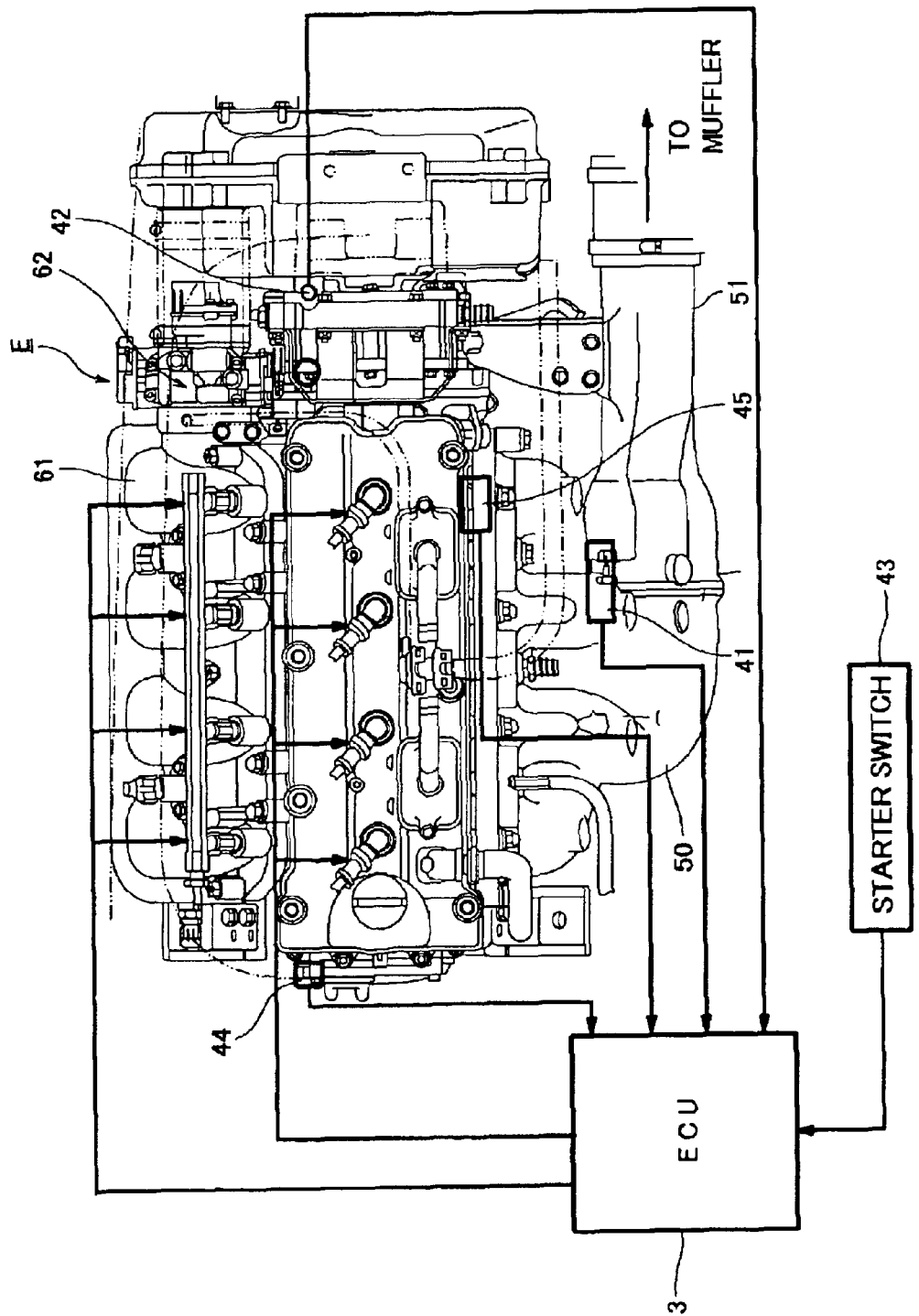
FIG. 3 is a block diagram showing a configuration of the apparatus for controlling an engine at the start-up, with which the personal watercraft according to the embodiment of the present invention equips, which especially shows provided positions of components of an input-and-output system of the apparatus.

FIG. 3 is a schematic view showing an example of an apparatus for controlling the engine E at start-up, mounted in the personal watercraft according to the embodiment of the present invention. In FIG. 3, the engine E is illustrated as seen in a plan view.

A water-temperature sensor 41 is provided in an exhaust passage of the engine E to detect a temperature of cooling water of the engine E and gives a detection signal to the ECU 3. As shown in FIG. 3, the water-temperature sensor 41 is positioned between an exhaust manifold 50 and an exhaust pipe 51 located downstream adjacent to the exhaust manifold 50.

In the engine E of the personal watercraft of this embodiment, the cooling water of the engine E is taken in from outside the watercraft and delivered into a water jacket formed within a cylinder block wall. Then, the cooling water flow is divided into two flows, a first flow to a water jacket formed within cylinder head(s), and a second flow to a water jacket formed within an exhaust passage wall, and each flow is thereafter discharged outside the watercraft. This type of cooling system is called "an open-looped cooling system" because outside water is used as its coolant.

More specifically, the water-temperature sensor 41 of this embodiment is located so as to enable detection of the temperature of the cooling water flowing first through the water jacket formed within the cylinder block(s) and then through the water jackets formed within the exhaust manifold 50 and/or the exhaust pipe 51. In this embodiment, as described above, water is used as a coolant since the open-looped cooling system is employed. However, other fluid or liquid may be used, so long as it serves to cool those engine components.

Meanwhile, an oil-temperature sensor 42 is provided in a passage of the lubricating oil (e.g., engine oil) of the engine E to detect a temperature of the lubricating oil and the sensor gives a detection result to the ECU 3. As shown in FIG. 3, the oil-temperature sensor 42 is located in a coolant inlet portion of an oil cooler provided outside of the engine E.

A crank-angle sensor 44 is provided on the crankshaft 13 (see FIG. 1) of the engine E. Specifically, the crank-angle sensor 44 is provided opposing a disk-shaped member attached to an end portion, opposite an output end of the crankshaft 13 (see FIG. 1) of the engine E. Alternatively, the crank-angle sensor 44 may be provided at any other desirable place, and may be provided opposing, for example, a flywheel (not shown) provided at the output end of the crankshaft 13. The crank-angle sensor 44 detects a rotational angle of the crankshaft 13 (i.e., a crank angle) by sensing a rotation of the disk-shaped member and the sensor gives the detected crank angle to the ECU 3.

A cylinder-stage determination sensor 45 is provided on camshaft(s) (not shown) of the engine E. The cylinder-stage determination sensor 45 detects a rotational angle of the camshaft (i.e., a cam angle) and gives the detected cam angle to the ECU 3.

Figure 4:
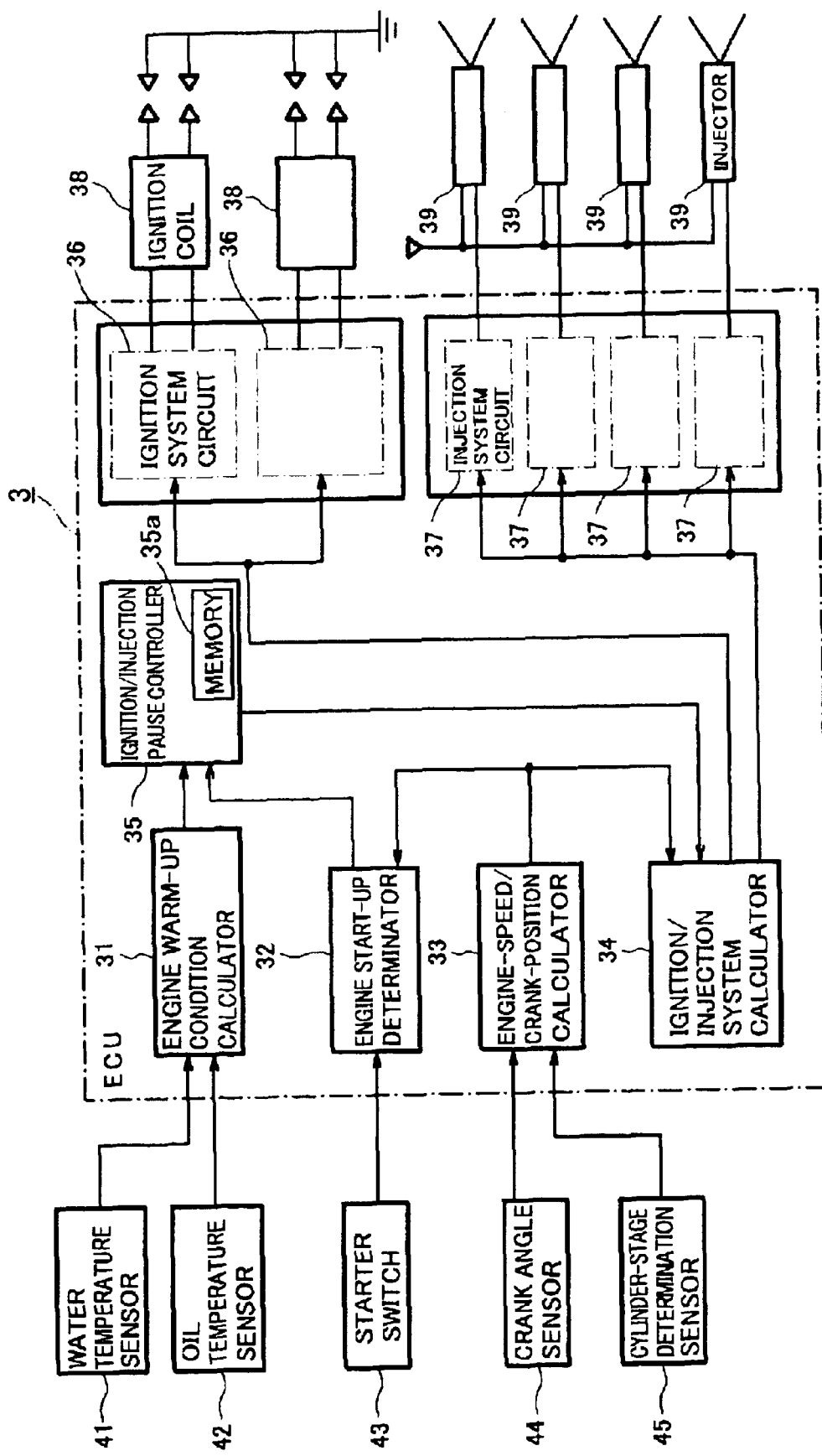
FIG. 4 is a block diagram showing a detailed configuration of the apparatus of controlling the engine at the start-up of FIG. 3.

As shown in FIG. 4, the ECU 3 comprises an engine warm-up condition calculator 31, an engine start-up determinator 32, an engine-speed/crank-position calculator 33, an ignition/injection system calculator 34, an ignition/injection pause controller 35, ignition system circuits 36, and injection system circuits 37.

The engine warm-up condition calculator 31 calculates a warm-up condition of the engine E based on a water temperature and/or an oil temperature given as the detection signals from the water-temperature sensor 41 and/or the oil-temperature sensor 42, and gives a calculation result to the ignition/injection pause controller 35.

The engine-speed/crank-position calculator 33 calculates the rotational speed of the crankshaft 13 (i.e., the engine speed) based on the crank angle given from the crank-angle sensor 44 and gives a calculation result to the engine start-up determinator 32. Alternatively, a cranking speed of the crankshaft 13 is used as the engine speed above because a first combustion of start-up has not occurred yet at this moment. The engine-speed/crank-position calculator 33 also calculates which stage within an engine cycle each of the cylinders are in, based on the cam angle given from the cylinder-stage determination sensor 45 and the calculator gives a calculation result to the ignition/injection system calculator 34.

In this embodiment, the engine start-up determinator 32 detects an ON-operation of the starter switch 43. In addition, the engine start-up determinator 32 determines whether or not the engine E is ready to start (i.e., whether or not the engine E is at a start-preparation stage prior to the first combustion during start-up), based on the detection of the ON-operation and the detected engine speed given from the engine-speed/crank-position calculator 33, and the determinator gives a result to the ignition/injection pause controller 35.

The ignition/injection system calculator 34 outputs an ignition signal and an injection signal to the ignition system circuits 36 and the injection system circuits 37, respectively, based on the result indicating which stage within an engine cycle each of the cylinders are in, which is given from the engine-speed/crank-position calculator 33. In addition, the ignition/injection system calculator 34 pauses the output of the ignition signal and/or the injection signal in accordance with an instruction in accordance with an ignition/injection pause control conducted by the ignition/injection pause controller 35 described later.

The ignition system circuits 36 are connected to ignition coils 38, and energizes the corresponding spark plugs to ignite fuel within the cylinders at appropriate timings, based on the ignition signal given from the ignition/injection system calculator 34.

The injection system circuits 37 are connected to injectors 39, and energizes the corresponding injectors 39 based on the injection signal given from the ignition/injection system calculator 34 to inject fuel at appropriate amounts and timings.

Figure 5:
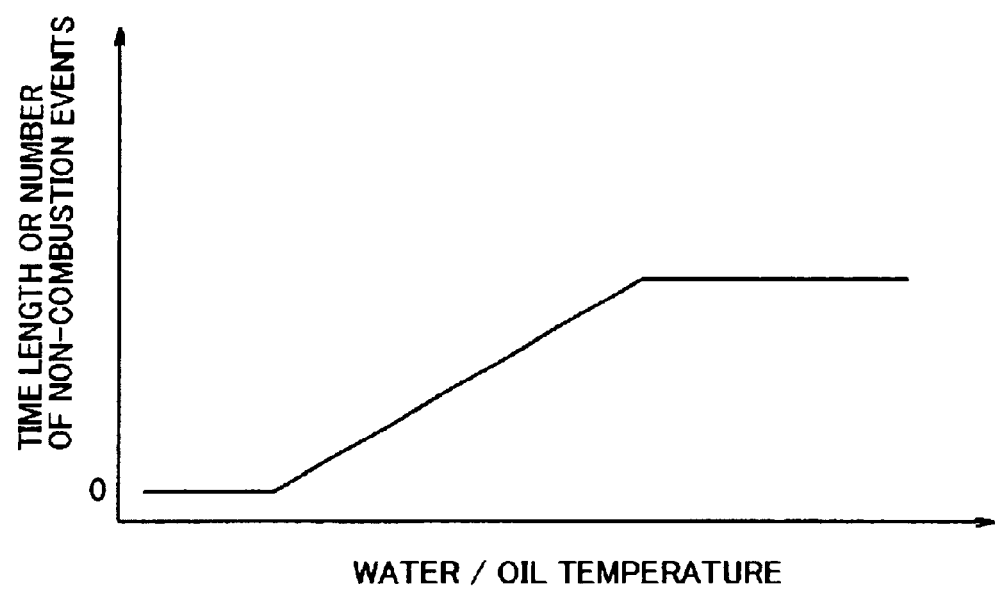
FIG. 5 is a graph showing time length of pause or number of non-combustion events plotted against water or oil temperature, which may be stored in a memory of an ignition/injection pause controller, as shown in FIG. 4.

The ignition/injection pause controller 35 comprises a memory 35a in which data represented by a graph in FIG. 5 is pre-stored. The data represents a predetermined pattern of noncombustion, such as a time length of pause of ignition or injection of a particular cylinder, or a periodic or nonperiodic pattern of pause of ignition or injection of a particular cylinder. According to this data, when the water temperature or the oil temperature is below a predetermined low temperature, the time length or number of non-combustion events during the pattern of non-combustion is set to zero to inhibit the pause of the combustion while, when the water temperature or the oil temperature is higher than the predetermined low temperature, the time length for pausing combustion or the number of non-combustion events in the predetermined pattern of non-combustion is gradually increased, as the temperature increases, until it reaches a relatively high temperature, at which time point the time length of the pause or the number of non-combustion events in the predetermined non-combustion pattern is set at a constant value.

Using the above described data, the ignition/injection pause controller 35 executes the ignition/injection pause control of the present invention in cooperation with the engine warm-up condition calculator 31 and the engine start-up determinator 32. Such a control is carried out as to follow a flowchart shown in FIG. 6, for example.

Figure 6:
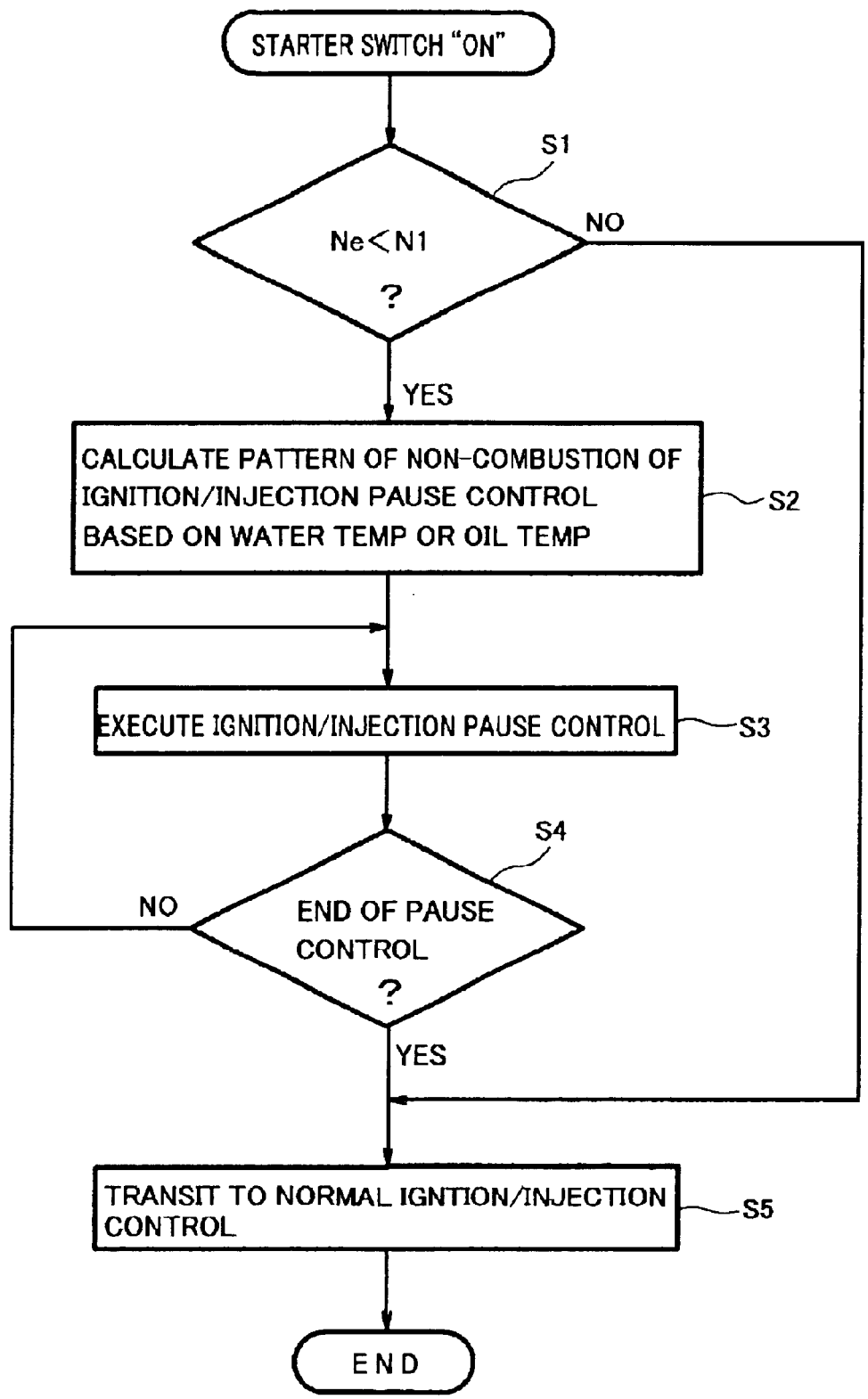
FIG. 6 is a flow chart showing a process of an electronic control unit of the apparatus of controlling the engine at the start-up of FIG. 3.

As shown in FIG. 6, this control is initialized upon a detection of an ON-operation of the starter switch 43 by the engine start-up determinator 32 as a trigger. Then, the engine start-up determinator 32 determines whether or not an engine speed Ne given from the engine-speed/crank-position calculator 33 is lower than a predetermined engine speed N1 (e.g., approximately 500 rpm to 600 rpm) (Step S1). When the engine start-up determinator 32 determines that the engine speed Ne is not lower than the predetermined engine speed N1 ("NO" in Step S1), the engine start-up determinator 32 then determines that an operator has operated the starter switch 43 by mistake during a normal cruising operation and, thus, causes the ignition/injection system calculator 34 to maintain a current normal control mode (i.e., a normal ignition/injection control) (Step S5).

On the other hand, when the engine start-up determinator 32 determines that the engine speed Ne is lower than the predetermined engine speed N1 ("Yes" in Step S1), the engine start-up determinator 32 then determines that the engine E is ready to start and, thus, gives a signal indicative of this condition to the ignition/injection pause controller 35.

Upon reception of this signal from the engine start-up determinator 32, the ignition/injection pause controller 35 calculates a predetermined pattern of non-combustion (i.e., time length of pause, or periodic or non-periodic pattern of non-combustion) of the ignition/injection pause control during start-up based on the detected water temperature and/or the oil temperature given by the engine warning-up condition calculator 31 with reference to the data stored in the memory 35a (see FIG. 5) (Step S2).

Then, the ignition/injection pause controller 35 gives a signal indicative of the calculated time length of pause of combustion or predetermined pattern of non-combustion to the ignition/injection system calculator 34 to cause the ignition/injection pause control to be executed (Step S3), and thereby inhibit combustion.

The ignition/injection pause control of this embodiment is configured to cause the ignition/injection system calculator 34 to temporarily inhibit ignition or fuel supply by stopping the ignition signal and/or the injection signal which would otherwise be output to the ignition system circuits 36 and the injection system circuits 37, respectively, under normal ignition/injection control (e.g., a period from Step S1 to Step S4). In this case, particular cylinder(s) (e.g., one to three cylinders among the four cylinders) may be controlled to pause both the ignition and injection, or may be controlled to pause only ignition, or only injection. Alternatively, the cylinder(s) to be paused may be changed in each cycle.

Then, the ignition/injection pause controller 35 determines whether or not the ignition/injection pause control should be terminated (Step S4). When the ignition/injection pause controller 35 determines that the control should not be terminated ("NO" in Step S4), the process is returned to Step S3, and then the controller 35 continues to execute the ignition/injection pause control.

Whether or not the ignition/injection pause control should be terminated may be determined by determining whether nor not a predetermined time has lapsed after the determination of "YES" is made in Step S1, or by determining that the engine speed Ne is no longer lower than the predetermined engine speed N1.

When ignition/injection pause controller 35 determines that the ignition/injection pause control should be terminated ("YES" in Step S4), the ignition/injection pause controller 35 then causes the ignition/injection system calculator 34 to stop supplying the signal indicative of the predetermined pattern of non-combustion (i.e., time length of pause of combustion, or periodic or non-periodic or pattern of non-combustion) of the ignition/injection pause control in order to set back the normal ignition/injection control.

Figure 7:
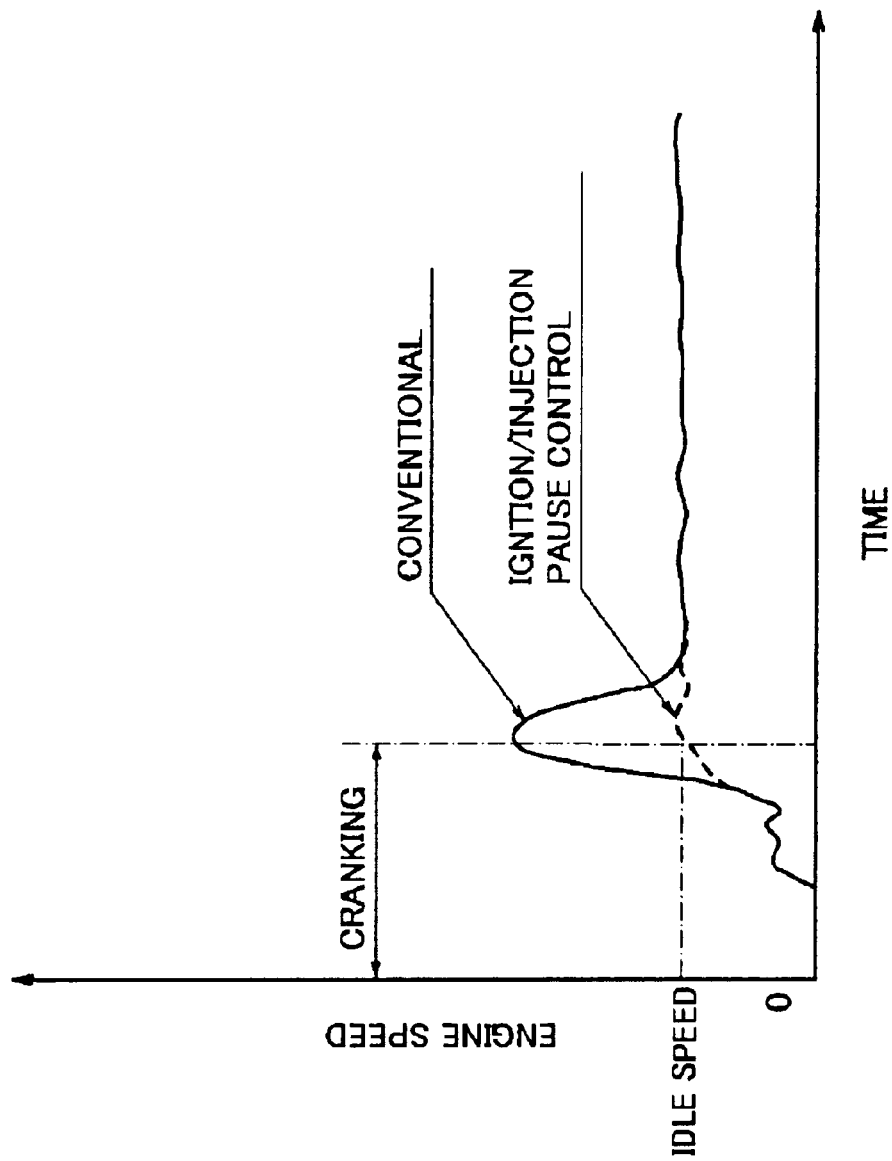
FIG. 7 is a graph showing a change in a rotational speed of the engine at the start-up when applying the control of the engine at the start-up of the engine according to the embodiment of the present invention (ignition/injection pause control), as compared with a change in the rotational speed applying the conventional control.

FIG. 7 is a graph showing a change in the engine speed during start-up of the engine E in the case where the ignition/injection pause control according to the present invention is applied, comparing with a change in the engine speed during start-up of the engine E under the conventional control. In FIG. 7, the Y axis represents an engine speed and the X axis represents time.

In the conventional control which is substantially identical to the normal ignition/injection control shown in FIG. 6, combustion is carried out in all the cylinders upon cranking of the engine E and, therefore, the engine speed rapidly increases after the first combustion as shown in FIG. 7. The conventional control is substantially the same as the control between Steps S1 and S4 except not carrying out the pause of combustion.

Usually, such a rapid increase in the engine speed is noticeably observed when the operator opens an engine throttle widely at start-up. The ECU 3 is generally configured to control the engine E not being able to start when the throttle is opened more than halfway. However, if the throttle is opened slightly less than halfway, the rapid increase in the engine speed can occur with a high possibility.

Consequently, in the case of applying the ignition/injection pause control, as indicated by a broken line in FIG. 7, the engine speed increases only gradually after the first combustion even when the throttle is wide open, because combustion is conducted in only a part of the cylinders.

The above embodiment has been described as to inhibit combustion in one or more cylinders of an engine to achieve a predetermined pattern of non-combustion, by controlling a time length of pause of combustion or a predetermined periodic or non-periodic pattern of non-combustion for selected cylinder(s). However, it is also possible to control delaying an ignition timing to attain similar effects to that of the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of Claims, or equivalence of such metes and bounds thereof are therefore intended to be embraced by Claims.

What is claimed is:

1. A method of controlling an engine speed of a multi-cylinder engine to regulate an increase of the engine speed at a start-up of the engine, comprising the steps of:
    detecting the start-up of the engine by detecting the engine speed;
    detecting a warm-up condition of the engine by detecting a coolant temperature of the engine or a lubricant temperature of the engine; and
    controlling the engine to inhibit combustion of at least one of the cylinders of the engine, according to the warm-up condition upon the detection of the start-up when the engine speed detected at the start-up is lower than a predetermined engine speed and when the coolant temperature or the lubricant temperature detected as the warm-up condition is greater than a predetermined value, wherein the engine includes a single throttle body.

2. An apparatus for controlling an engine speed of a multi-cylinder engine to regulate an increase of the engine speed at a start-up of the engine, comprising:
    a start-up detector for detecting the start-up of the engine, wherein the start-up detector detects the start-up of the engine by detecting the engine speed;
    a warm-up condition detector for detecting a warm-up condition of the engine, wherein the warm-up condition detector detects a coolant temperature of the engine or a lubricant temperature of the engine; and
    a controller for controlling the engine to inhibit combustion of at least one of the cylinders of the engine according to the warm-up condition detected by the warm-up condition detector upon the detection of the start-up by the start-up detector, wherein the controller performs the control when the engine speed detected by the start-up detector is lower than a predetermined engine speed, and wherein the controller performs the control when one of the coolant temperature or the lubricant temperature detected by the warm-up condition detector is greater than a threshold value, wherein the engine includes a single throttle body.

3. The apparatus of claim 2, wherein the controller is configured to inhibit combustion according to a predetermined pattern of non-combustion.

4. The apparatus of claim 3, wherein the predetermined pattern of non-combustion includes a pause of combustion of at least one of the cylinders of the engine for a predetermined time length.

5. The apparatus of claim 3, wherein the predetermined pattern of non-combustion includes a periodic or non-periodic pattern of non-combustion for at least one of the cylinders of the engine.

6. The apparatus of claim 3, wherein the engine includes a fuel supply device, and wherein the controller is configured to cause the predetermined pattern of non-combustion by inhibiting fuel supply through the fuel supply device.

7. The apparatus of claim 3, wherein the engine includes an igniting device, and wherein the controller is configured to cause the predetermined pattern of non-combustion by inhibiting spark from the igniting device.

8. The apparatus of claim 2, wherein the controller is an electronic control unit.

9. The apparatus of claim 2, wherein the engine is four-cycle engine.

10. The apparatus of claim 2, wherein said warm-up condition of the engine is detected from a water temperature sensor positioned between an exhaust manifold and an exhaust pipe of the multi-cylinder engine.

11. The apparatus of claim 2, wherein said control is triggered by an ON operation of a starter switch.

12. The apparatus of claim 2, wherein the multi-cylinder engine includes a cooling system that uses outside water as a coolant.

13. The apparatus of claim 2, wherein said inhibition of combustion is terminated when engine speed is no longer lower than the predetermined engine speed.

14. The apparatus of claim 3, wherein the controller includes a memory configured to store the predetermined pattern of non-combustion.

15. The apparatus of claim 3, wherein the predetermined pattern of non-combustion includes non-combustion at a predetermined subset of combustion opportunities for at least one cylinder of the multi-cylinder engine.

16. A personal watercraft comprising:
    a multi-cylinder engine;
    a water jet pump with which an input shaft thereof is connected rotatably full-time with an output shaft of the engine; and
    an apparatus for controlling an engine speed of the engine to regulate an increase of the engine speed at a start-up of the engine, the apparatus including:
        a start-up detector for detecting the start-up of the engine;
        a warm-up condition detector for detecting a warm-up condition of the engine; and
        a controller for controlling the engine to inhibit combustion of at least one of the cylinders of the engine according to the warm-up condition detected by the warm-up condition detector upon the detection of the start-up by the start-up detector,
    wherein the start-up detector detects a pressure inside the water jet pump, and wherein the controller performs the control when the pressure detected by the start-up detector is lower than a predetermined pressure.

* * * * *